Dec. 28, 1954  V. G. KLEIN  2,698,190
HOSE COUPLING
Filed April 6, 1951

Victor G. Klein,
Inventor.
Koenig and Pope,
Attorneys.

United States Patent Office 2,698,190
Patented Dec. 28, 1954

2,698,190

HOSE COUPLING

Victor G. Klein, Defiance, Mo., assignor to Lincoln Engineering Company, St. Louis, Mo., a corporation of Missouri Application April 6, 1951, Serial No. 219,538

6 Claims. (Cl. 285—86)

This invention relates to hose couplings, and more particularly to hose couplings of the type for use on the end of a length of hose for connection of fittings thereto or for connecting lengths of hose together.

The object of the invention is the provision of improved two-part hose couplings of the class described, particularly for high pressure hose, which may be readily applied to and removed from the ends of lengths of hose, without requiring any special tools or skill; which may be re-used many times; and which, when properly applied to the ends of lengths of hose, are attached so tightly that no leakage occurs through the coupling, even under high pressure conditions.

In general, a coupling made in accordance with the invention comprises a sleeve having an enlarged threaded socket in one end with an annular shoulder at the inner end of the socket. The sleeve is adapted for the insertion therein from its other end of a hose to such an extent that the end of the hose projects into the socket somewhat beyond the shoulder. A stud has a screw portion threaded in the socket and a shank projecting from the screw portion adapted to enter the bore in a hose and radially expand the hose. The stud has an axial fluid passage through its screw portion and shank. The arrangement is such that the stud may be threaded into the socket to flare out the end of the hose which projects into the socket and to compress the flared-out end of the hose between the shoulder and the adjacent end of the screw portion of the stud, the shank radially expanding the hose and causing radial compression thereof between the shank and the internal wall of the sleeve. Other features will be in part apparent and in part pointed out hereinafter.

The invention accordingly comprises the elements and combinations of elements, features of construction, and arrangements of parts which will be exemplified in the structures hereinafter described and the scope of which will be indicated in the following claims.

In the accompanying drawings, in which several of various possible embodiments of the invention are illustrated, Fig. 1 is a view in elevation of a stud part of a coupling of this invention;

Similar reference characters indicate corresponding parts throughout the several views of the drawings.

Figure 1:
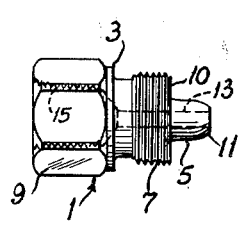
Figure 2:
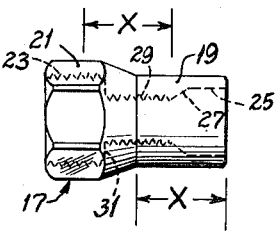
Fig. 2 is a view in elevation of a sleeve part used with the part shown in Fig. 1.
Figure 3:
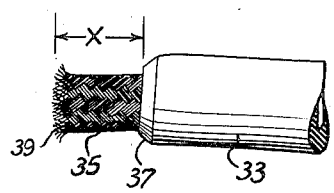
Fig. 3 is a view in elevation of the end portion of a length of wire-core hose as prepared for application of the coupling.
Figure 4:
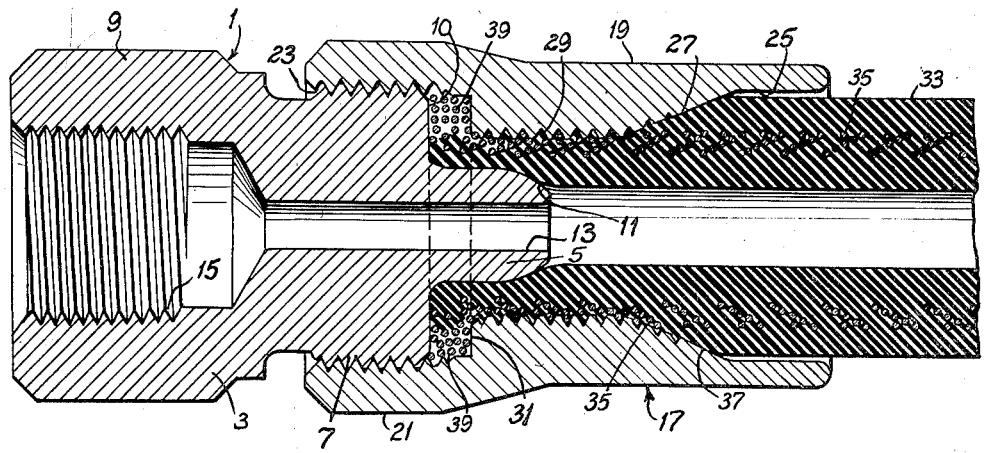
Fig. 4 is a longitudinal section on an enlarged scale showing the parts of Figs. 1 and 2 as applied to the end of the hose shown in Fig. 3.

Referring to the drawings, Figs. 1 and 2 illustrate the two parts of a coupling of this invention, particularly for use on a high pressure hose of the type made of rubber or the like and having a core of braided wire. The end portion of a length of rubber hose of this type, with the outer layer of rubber skinned off to expose the wire core for some distance back from the end of the hose, is shown in Fig. 3. Such hose is conventional and well known, generally consisting of a tubular reinforcing core of braided wire with rubber or the like on the inside and the outside of the core. The wire core may be of single-ply or multi-ply formation. A tubular core made of yarn may also be incorporated in the hose in addition to the wire core. Such hose is available in different sizes, and it is to be understood that couplings of different sizes are needed for different sizes of hose. Fig. 4 illustrates the two parts shown in Figs. 1 and 2 as they are applied to the skinned end portion of the hose illustrated in Fig. 3.

Figure 6:
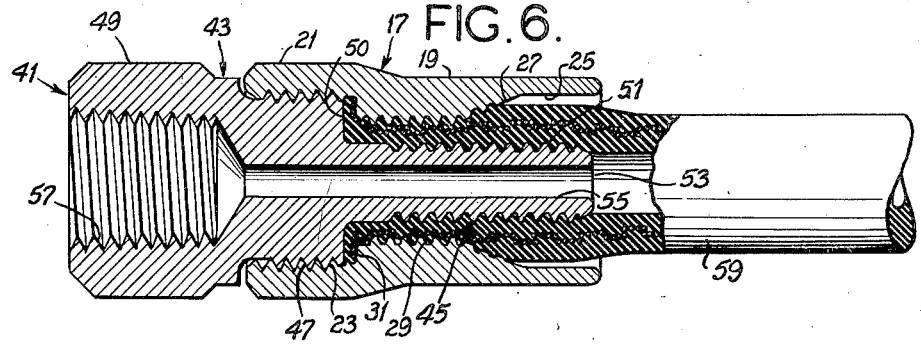
Figure 5:
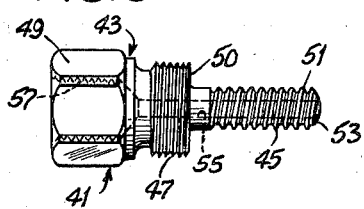
Fig. 5 is a view in elevation of a modified form of stud for use with the sleeve shown in Fig. 2 on a yarn-core hose; and, Fig. 6 is an enlarged longitudinal section showing the Fig. 5 stud and the Fig. 2 sleeve applied to the end of a yarn-core hose.

The invention also pertains to a two-part coupling for hose which cannot be skinned like a hose having a braided wire core, for example high pressure hose of the type having a yarn core only (no wire core). Fig. 5 illustrates a part which replaces the part shown in Fig. 1 for use with such a yarn-core hose, the same part as shown in Fig. 2 being used, and Fig. 6 illustrates the Fig. 5 part and the Fig. 2 part applied to a yarn-core hose.

More particularly, the part shown in Fig. 1 is referred to as a stud, and is generally designated 1. It is made of steel, for example, and has a body 3 and a cylindrical shank 5. The body 3 is formed to provide an externally screw-threaded cylindrical screw portion 7 with a hexagonal head 9 for application of a wrench or the like. The shank 5 extends generally axially from an annular flat shoulder 10 at the inner end of the screw portion 7 connecting the screw portion and shank. The shank is of considerably smaller diameter than the screw portion. As related to the size of hose with which the coupling is to be used, the diameter of the shank is somewhat greater than the inside diameter or bore of the hose. The shank is relatively short, externally smooth, and its end is tapered as indicated at 11. This taper is preferably rounded, as shown, rather than being conical, so as to make the end of the shank in the form of a hose adapted readily to enter the bore in the hose. The stud 1 has an axial bore 13, and is counterbored and internally screw threaded witthin its hexagonal head, as indicated at 15. This provides an axial fluid passage through the stud and means for screw-connecting the stud and other parts, such as various fittings.

The part shown in Fig. 2 is referred to as a sleeve, and is generally designated 17. It is made of steel, for example, and has a cylindrical body portion 19 with a hexagonal head 21 at one end for application of a wrench. This one end of the sleeve is its outer end as related to the hose. The sleeve has an internally screw-threaded counterbore constituting an enlarged socket 23 in this end which receives the screw portion 7 of the stud 1. In the other end of the sleeve (its inner end as related to the hose) is an unthreaded counterbore 25, and from the inner end of the counterbore 25 there is a taper bore 27 to a cylindrical bore 29 which extends through the sleeve to the counterbore or socket 23. The diameter of the counterbore 25 is somewhat greater than the outside diameter of hose of the size with which the coupling is to be used, so that the end of the hose may be readily inserted into the respective end of the sleeve. The bore 29 is screw-threaded, the screw thread continuing for some distance into the taper bore 27 as a taper thread of diminishing depth. The internal diameter of the bore 29 measured to the root of the thread (root diameter) is approximately equal to the outer diameter of the wire core of hose of the size with which the coupling is to be used. At the inner end of the socket 23 there is an annular substantially flat transverse shoulder 31 facing the adjacent flat shoulder 10 of the screw portion 7 of the stud. Shoulder 31 connects the socket 23 and the bore 29 and is substantially parallel to shoulder 10.

Referring to Fig. 3, the hose is designated 33 and its braided wire core is designated 35. The outer layer of the hose is shown as being skinned off to expose the wire core for a distance X which is somewhat greater than the length of the cylindrical bore 29 as measured from the inner end of the taper bore to the socket. The sleeve is preferably so made that the length of its cylindrical body portion 19 corresponds to the distance X which the end of the hose should be skinned off, so that the sleeve itself serves as a convenient gauge to apprise the user as to this distance. The end of the outer layer of the hose after skinning is preferably tapered, as indicated at 37.

When a length of hose is cut and its end skinned, the cut end of the wire core flares outward to some extent as indicated at 39.

In applying the coupling to the skinned end of the hose shown in Fig. 3, the first step in the operation is the insertion of the skinned end of the hose into the counterbore 25 in the end of the sleeve opposite the socket, and the threading of the sleeve onto the exposed portion of the wire core. This may be readily accomplished by screwing the sleeve onto the end of the hose, using a wrench applied to the hexagonal head 21. The end of the hose enters the sleeve to the point where the tapered end 37 of the outer layer of the hose engages the taper bore 27, the insertion being such that the end of the hose with the flared-out end of the wire core 39 reaches past the annular shoulder 31 into the socket 23. Then the cylindrical portion 7 of the stud 1 is threaded into the socket 23, to the point where the end of the hose is made to further flare out and to be compressed between the shoulder 10 of the cylindrical screw portion 7 and the shoulder 31. As the stud is screwed into the socket, the shank 5 enters the bore of the hose, and radially expands the portion of the hose surrounding the shank. The result is that the flared-out end of the skinned hose is axially compressed between the shoulder 10 of the screw portion 7 of the stud and the shoulder 31, and the portion of the hose surrounding the shank including the surrounding portion of the exposed wire core is radially expanded and compressed between the shank and the interior threaded wall of the bore 29, with the wire core taking a strong bite into the thread in the bore 29 (see Fig. 4). This effects a tight seal, and a powerful locking action of the end of the hose in the coupling. However, the coupling can be readily removed from the hose for re-use simply by threading the stud 1 out of the sleeve, and then threading the sleeve off the hose. An important feature and advantage of the arrangement is that the end portion of the hose which is compressed in the coupling has all the rubber thereof completely surrounded by metal.

Another feature and advantage of the arrangement is that the shank 5 of the stud 1 is so short as to leave a portion of the hose within the bore 29 (the portion from the end of the shank to right end of the bore 29 as viewed in Fig. 4) exposed to receive fluid pressure. Accordingly, the fluid pressure expands this portion of the hose, forcing it tightly against the internal threaded wall of the sleeve 17 in the bore, and this augments the grip as between the hose and the sleeve.

The stud shown in Fig. 5 is generally designated 41 and has a body 43 and a shank 45. The body 43 is formed as an externally screw-threaded cylindrical screw portion 47 with a hexagonal head 49 for application of a wrench. The shank 45 extends generally axially from an annular flat shoulder 50 at the inner end of the screw portion 47 connecting the screw portion and shank. The shank is of considerably smaller diameter than the screw portion, and considerably longer than the shank 5 of the stud 1. It is externally screw-threaded as indicated at 51, and its end is formed as a nose as indicated at 53. The diameter of the shank is somewhat greater than the bore of the hose with which the stud 41 is to be used. The stud has an axial bore 55, and is counterbored and internally screw threaded within its hexagonal head, as indicated at 57, like the stud 1.

In applying the stud 41 and sleeve 17 to the end of a yarn-core hose such as indicated at 59 in Fig. 6, this hose being one having an outside diameter somewhat less than the diameter of the counterbore 25 in the sleeve 17, the end of the hose is inserted into the counterbore 25 in the end of the sleeve opposite the socket 23, and the sleeve is screwed onto the end of the hose, the threads in the bore 29 in the sleeve cutting into the layer of rubber outward of the yarn core, to the point where the end of the hose extends to some extent into the socket 23 past the shoulder 31. Then the shank 45 is entered and screwed into the bore in the hose, and the cylindrical portion 47 of the stud is threaded into the socket 23 to the point where the end of the hose is made to flare out and be axially compressed between the shoulder 50 of the cylindrical screw portion 47 and the shoulder 31 (see Fig. 6). The shank 45 radially expands the end portion of the hose and effects a radial compression thereof, with the hose taking a strong bite into the thread in the bore 29 in the sleeve and the thread on the shank 45. This effects a tight seal, and a powerful locking action of the end of the hose in the coupling, yet allowing for ready removal of the coupling so that it may be re-used, simply by threading the stud out of the sleeve and then threading the sleeve off the hose.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. In combination, a hose having a reinforcing core, a sleeve having a substantially cylindrical screw-threaded bore and a screw-threaded counterbore forming a threaded socket in one end thereof with an annular substantially transverse shoulder at the inner end of the socket connecting the bore and the counterbore, the sleeve also having a second counterbore at its other end with a taper bore leading from the inner end of this counterbore to said screw-threaded bore, the diameter of said screw-threaded bore being less than the outside diameter of the hose and greater than the diameter of the bore in the hose, the diameter of the second counterbore being greater than the outside diameter of the hose, and a tubular stud having a screw portion complementary to said threaded socket and a substantially cylindrical shank of larger outside diameter than the bore in the hose and of smaller outside diameter than the screw-threaded bore in the sleeve projecting from one end of the stud, with an annular substantially transverse shoulder connecting the screw portion of the stud and the shank, said shank being integral with the stud to be movable therewith, said sleeve being threaded with its said one end outermost onto one end of the hose to the point where an end portion of the hose projects into the socket, and said stud having its shank extending into the bore in the hose and its screw portion threaded in said socket to the point where said end portion of the hose, including the corresponding portion of the reinforcing core, is flared out and axially compressed between said shoulders, said shank radially expanding the portion of the hose in said screw-threaded bore in the sleeve to effect compression thereof between the shank and the internal surface of the sleeve in said screw-threaded bore.

2. The combination specified in claim 1 wherein the thread of the bore in the sleeve continues for some distance into the taper bore as a taper thread of diminishing depth.

3. The combination specified in claim 2 wherein the shank is shorter than the length of the sleeve from the shoulder at the inner end of the socket to the said other end of the sleeve.

4. The combination specified in claim 2 wherein the shank terminates short of the end of the screw-threaded bore in the sleeve where said screw-threaded bore merges with the taper bore.

5. The combination specified in claim 2 wherein the shank is externally threaded.

6. The combination specified in claim 2 wherein the reinforcing core in the hose is a wire core, wherein said core is exposed for some distance at said end of the hose, and wherein the root diameter of the screw-threaded bore in the sleeve approximates the outside diameter of the core.

References Cited in the file of this patent

UNITED STATES PATENTS

| Number | Name | Date |
|---|---|---|
| 675,336 | Luke | May 28, 1901 |
| 1,361,758 | Ewald | Dec. 7, 1920 |
| 2,394,632 | Parker | Feb. 12, 1946 |
| 2,399,791 | Conroy | Mar. 7, 1946 |
| 2,476,480 | Burke | July 19, 1949 |

FOREIGN PATENTS

| Number | Country | Date |
|---|---|---|
| 56,070 | Norway | Jan. 13, 1936 |
| 375,272 | Italy | Sept. 30, 1939 |